(12) United States Patent
Yamanaka

(10) Patent No.: US 6,658,783 B1
(45) Date of Patent: Dec. 9, 2003

(54) PRESET FISHING LINE TENSION MEASURING DEVICE

(75) Inventor: Takashi Yamanaka, Tokyo (JP)

(73) Assignee: Tanashin Denki Co., Ltd., Tokyo (JP)

( * ) Notice: Subject to any disclaimer, the term of this patent is extended or adjusted under 35 U.S.C. 154(b) by 278 days.

(21) Appl. No.: 09/678,405

(22) Filed: Oct. 3, 2000

(30) Foreign Application Priority Data

Oct. 4, 1999 (JP) .............................. 11-282892

(51) Int. Cl.$^7$ .......................... A01K 97/12; A01K 87/02
(52) U.S. Cl. ................................................. 43/25; 43/4
(58) Field of Search .................. 43/4, 25; 73/862.471

(56) References Cited

U.S. PATENT DOCUMENTS

| | | | | |
|---|---|---|---|---|
| 1,277,874 A | * | 9/1918 | Crowell | 43/25 |
| 2,500,026 A | * | 3/1950 | Erickson | 33/134 |
| 2,529,320 A | * | 11/1950 | Vibber | 73/862.471 |
| 2,564,150 A | * | 8/1951 | Brown | 73/862.471 |
| 2,576,629 A | * | 11/1951 | Morby | 43/25 |
| 2,752,686 A | * | 7/1956 | Anderson et al. | 43/25 |
| 2,860,508 A | * | 11/1958 | Johnson | 73/862.471 |
| 3,874,108 A | * | 4/1975 | Connor | 43/25 |
| 5,088,223 A | * | 2/1992 | Chu | 43/17 |
| 5,345,691 A | * | 9/1994 | Falk et al. | 33/707 |
| 5,782,033 A | * | 7/1998 | Park et al. | 43/4 |

FOREIGN PATENT DOCUMENTS

| | | |
|---|---|---|
| JP | 7-23683 | 1/1995 |
| JP | 8-103195 | 4/1996 |
| JP | 11-196731 | 7/1999 |

* cited by examiner

Primary Examiner—Kurt Rowan

(57) ABSTRACT

A preset fishing line tension measuring device for permitting accurate fishing line tension adjustment with a drag mechanism is provided. A pair of fishing line guides are disposed in a spaced-apart relation to each other, and a tension sensor is disposed such as to provide an increased length of path of the fishing line between the two fishing line guided. Fishing line tension sensed by the tension sensor is displayed on a display part.

8 Claims, 4 Drawing Sheets

PRESET FISHING LINE TENSION MEASURING DEVICE

BACKGROUND OF THE INVENTION

1. Field of the Invention

This invention relates to a preset fishing line tension measuring device for measuring fishing line tension preset in a drag, mechanism in fishing.

2. Description of the Prior Art

A usual fishing line take-up reel has a drag mechanism for preventing the fishing line from being broken when pulled with a strong force or suddenly. For example, Japanese Patent Disclosure No. 11-196731 discloses such a reel. This reel is given a braking force such that when the fishing line is pulled with a strong force in excess of the braking force, the fishing line is rewound-while being under a predetermined tension. The fishing line tension can be freely preset by controlling the braking force provided to the reel, and it is usually preset to about 20 to 30% of the break-strength of the Wishing line.

Techniques for measuring the fishing line tension preset in the drag mechanism are disclosed in, for instance, Japanese Patent Disclosure No. 8103195 and Japanese Patent Disclosure No. 7-23683. in the technique disclosed in the Japanese Patent Disclosure No. 8-103195, a torque sensor is assembled in a reel shaft such that it electrically reads out torque applied to the reel shaft when the reel shaft is rotated, and the circle diameter of the fishing line on the reel is computed with ultrasonic transmitting and receiving elements and used for determining fishing line tension. In the technique disclosed in the Japanese Patent Disclosure No. 7-23683, a sensor is set in a spring balance at a desired position thereof such that it generates a sound or light signal when a desired load is applied to the balance. The end of the fishing line is connected to the balance, and the fishing line tension is controlled with a drag mechanism by causing it to eat on the balance.

The technique disclosed in Japanese Patent Disclosed No. 8-103195, however, requires assembling a torque sensor on the reel shaft and also providing ultrasonic transmitting and receiving elements and an arithmetic circuit. Therefore, the technique has a problem that its construction is inevitably complicated.

According to the Japanese Patent Disclosure No. 7-23683, it is necessary to pull out the fishing line would on the reel from the fishing rod end, connect the pulled-out fishing line to the spring balance and control the drag mechanism assembled in the reel in this state. Therefore, an inconvenience is felt that it is necessary to have the balance held by someone or secure the balance in some locality when adjusting the fishing line tension.

The invention was made in view of the above problems, and it has an object of providing a preset fishing line tension measuring device, which is simple in construction and permits ready and accurate fishing in tension measurement as well as being capable of being handily used.

SUMMARY OF THE INVENTION

In the preset fishing line tension measuring device according to the invention, a tension sensor, which is displaced such as to provide an increased length of path of fishing line between pair fishing line guides disposed in a spaced-apart relation to each other, senses a fishing line tension, and the sensed tension is displayed on a display part.

According to the invention, the pair fishing line guides and the tension sensor are of a pulley type.

Also according to the invention, the display part displays the fishing line tension as a rotation angle of a pointer, the tension sensor is disposed on a movable member, which is biased by a spring in the direction opposite to the fishing line tension acting on the tens on sensor, and the displacement of the movable member is enlarged by a gear mechanism while it is transmitted to a pointer in the display part.

Further according to the invention, a securing means for securing the measuring device to a fishing rod is provided.

Still further according to the invention, a pressure-electricity converting element for converting the fishing line tension sensed by the tension sensor to an electrical signal, is provided for displaying its output by a digital display.

Yet further according to the invention, the display and measuring parts are disposed in a remotely spaced-apart relation to each other.

In the use of the preset fishing line tension measuring device according to the invention, the fishing line wound on a reel is passed round first and second fishing line guides by also passing it round a tension sensor for providing an increased length of path of fishing line between the two fishing line guides to form a loop of the fishing line. In this state, by pulling the fishing line with a hand, the tension sensor senses the tension in the fishing line, and the sensed tension is displayed on the display part. It is thus possible to preset the fishing line tension to a desired level by adjusting the drag mechanism while watching the display on the display part, which is disposed near the reel. Besides, the construction is simple, and accurate tension-measurement is obtainable. Particularly, by employing a pulley type of the pair fishing line guides and tension sensor, it is possible to reduce the frictional resistance offered between each of the pulley type elements and the fishing line, and no extra force is needed when pulling the fishing line. The measuring device thus can be used more handily.

Furthermore, by adopting the display part to be of a dial type to display the tension as a rotation angle of the pointer, disposing the tension sensor on the movable member, which is biased in the direction to oppose the fishing line tension permitting the displacement of the movable member to be enlarged by the gear mechanism so as to drive the display part pointer with the enlarged displacement, even a slight displacement of the movable member can be enlarged by the gear mechanism, so that more accurate displacement of the pointer is obtainable.

Still further, with securing means provided to secure the measuring device to a fishing rod, when the fishing line is suddenly pulled, the tension sensor is also displaced and provides a buffering effect in addition to warping of the fishing rod and rewinding of the fishing line by the drag mechanism. It is thus possible to alleviate shock on the fishing line.

Furthermore, with the pressure-electricity converting element provided for conversion of the fishing line tension sensed by the tension sensor to an electric signal and digital display thereof on the display part, the movable member and the tension sensor may be less displaced, thus facilitating the size reduction. In this case, it is possible to dispose the display and measuring parts in a remotely spaced-apart relation to each other. By so doing, the freedom of status of use of the measuring device can be enhanced.

BRIEF DESCRIPTION OF THE DRAWINGS

These and other objects, features and advantages of the invention will become more apparent upon reading of the following detailed specification and drawings, in which.

DETAILED DESCRIPTION OF THE PREFERRED EMBODIMENTS

Figure 1:
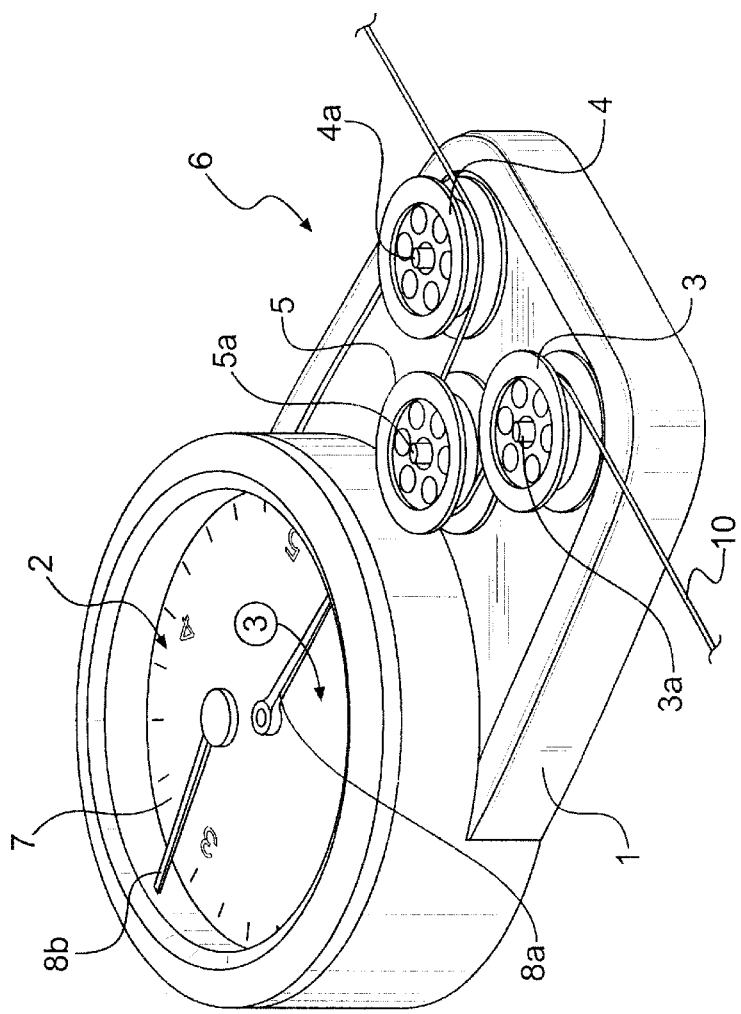
FIG. 1 is a perspective view showing a first embodiment of the fishing line tension measuring device according to the invention.

FIG. 1 is a perspective view showing a first embodiment of the preset fishing line tension measuring device according to the invention. As shown in the Figure, the device comprises a body 1, on which a dial type display part 2 and a measuring part 6 disposed adjacent thereto. The measuring part 6 includes a pair of pulley type fishing line guides 3 and 4 for guiding a fishing line 10 which is engaged with the periphery of the guides 3 and 4 respectively. The measuring part 6 further includes a pulley type tension sensor 5. Each of the fishing line guides 3 and 4, and the tension sensor 5 is preferably constituted by a pulley having a groove around the periphery thereof. The display part 2 includes a scale board 7, and also includes a pointer driver 8a and a pointer 8b provided on the scale board 7. The fishing line tension is displayed as a clockwise ③ rotation angle of the pointer driver 8a. The pointer 8b has a bent free end. With clockwise rotation ③ of the pointer driver 8a, the bend end is pushed by and rotated in unison with the pointer driver 8a. On the other hand, when the pointer driver 8a returns counterclockwise, the bent end does not return by following the pointer driver 8a, and thus the pointer 8b is held at the maximum rotation position of the pointer driver 8a and continually indicates the maximum tension.

Figure 2:
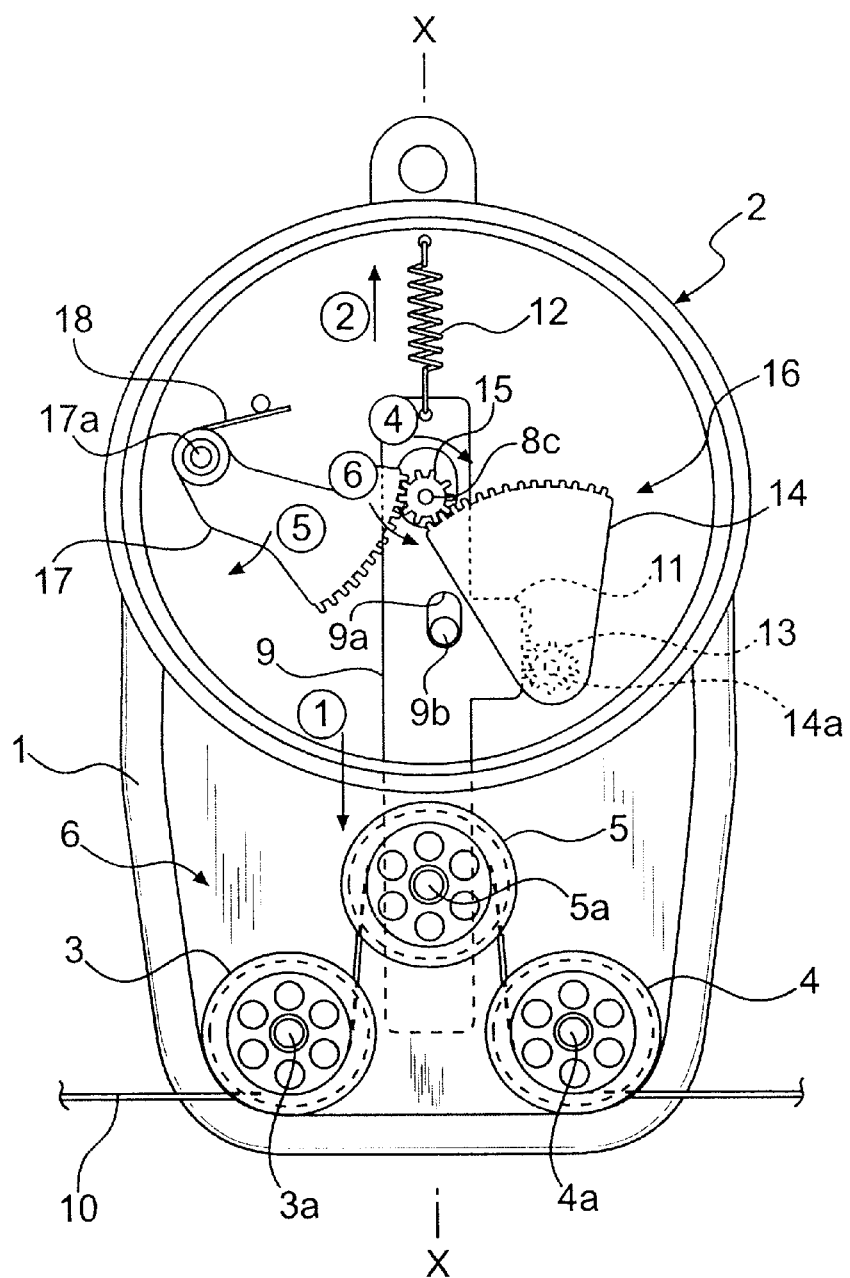
FIG. 2 is a plan view showing the same embodiment while omitting a scale board, a pointer driver and a pointer.

FIG. 2 is a plan view showing the measuring device while omitting the scale board 7, the pointer driver 8a and the pointer 8b. As shown in the Figure, the pair fishing line guides 3 and 4 are supported on the body 1 via shafts 3a and 4a, respectively, at spaced-apart positions. The tension sensor 5 is supported on a movable member 9 which is mounted on the body 1 via a shaft 5a. Between the pair of guides 3 and 4 is formed a loop of the fishing line 10 which is engaged with the periphery of the tension sensor 5. The tension sensor 5 has an effect of providing a greatly increased length of the path of the fishing line 10 to form the loop thereof between the two fishing line guides 3 and 4. The movable member 9 has a rack formed on one side of it, and can be reciprocally displaced ①, ② by a fixed distance in the longitudinal direction of the measuring device body 1 with its longitudinal direction held coincident with direction X—X perpendicular to a line connecting the centers of the two guides 3 and 4. The member 9 is also biased by a tension coil spring 12 and tends to displace the tension sensor 5 away ② from the pair guides 3 and 4.

The movable member 9 has a slot 9a, in which a fixed pin 9b provided on the body 1 is engaged. By this engagement, a range of displacement of the movable member 9 in the direction X—X is prescribed. As shown in FIG. 2, in the absence of action of tension in the fishing line 10 on the tension sensor 5, the movable member 9 is held at a predetermined position, at which the pin 9b is in engagement with an end of the slot 9a, by the spring force of the spring 12. When the movable member 9 is acted on by tension in the fishing line 10, it is displaced from the predetermined position noted above toward ① the pair fishing line guides 3 and 4. At this time, a spring force against the fishing line tension is exerted on the movable member 9 in the direction ② opposite to the direction of movement of the movable member 9.

In this embodiment, a tension spring is employed as spring 12. However, it is also possible to employ a bar spring. In this case, the bar spring is normally held in engagement with the member 9 to hold the member 9 at a predetermined position. When tension in the fishing line 10 acts on the movable member 9, the bar spring allows the member 9 to be moved in one direction ① from the predetermined position, while at the same time exerts a spring or elastic force on the member 9 in the other direction ②. In the case of employing this bar spring, the slot 9a and the pin 9b in the embodiment shown in FIG. 2 are unnecessary.

On the measuring device body 1, a first sector gear 14 with an integral pinion gear 13 provided at the center of its rotation is mounted via a shaft 14a. A small gear 15 is mounted on a shaft 8c of the pointer driver 8a such that it can be rotated in unison with the pointer driver 8a.

The radius of rotation of the first sector gear 14 is set to be "sufficiently" greater than the radius of the greater radius one of the pinion and small gears 13 and 15. The pinion and first sector gears 13 and 14 are in mesh with a rack 11 of the movable member 9 and the small gear 15, respectively, and thus transmit the displacement of the movable member 9 in an enlarged fashion to the pointer driver 8a. It will be seen that the rack 11, the pinion gear 13, the first sector gear 14 and the small gear 15 together constitute a gear mechanism 16 for transmitting the movement of the movable member 9 in an enlarged fashion to the pointer driver 8a. A second sector gear 17 is mounted on the measuring device body 1 via a shaft 17a. The gear 17 biased clockwise ⑤ by a torsion spring 18 providing weak spring force, and is in mesh with the small gear 15 to bias the gear 15 in the counterclockwise direction ⑥ about the shaft 8c.

Figure 3:
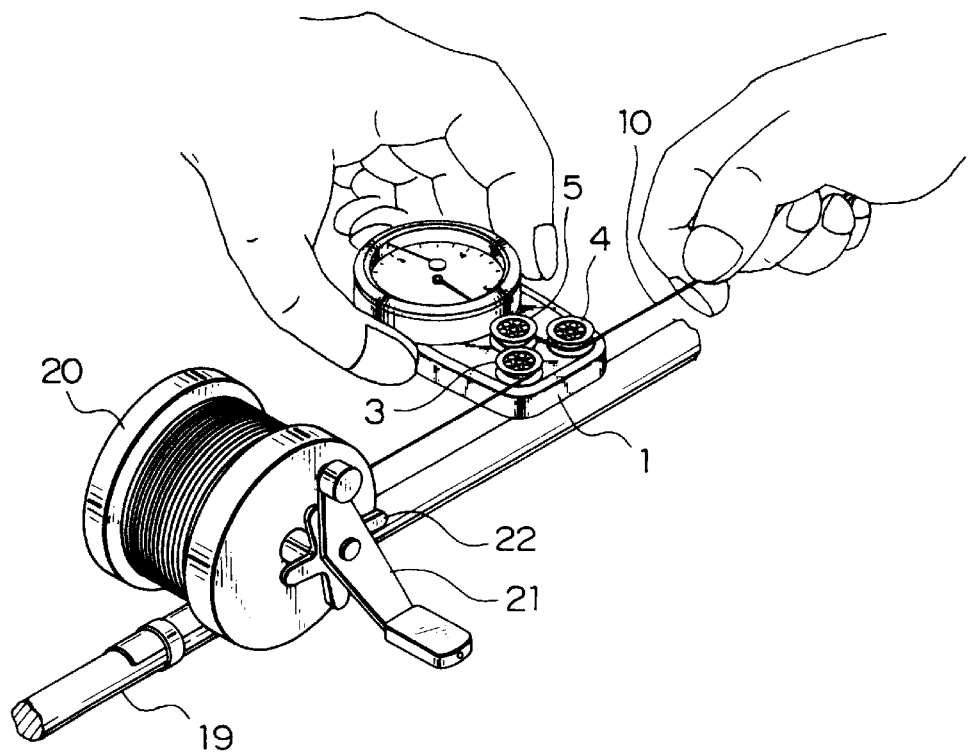
FIG. 3 is a fragmentary perspective view showing the same embodiment in use.

FIG. 3 is a perspective view showing the measuring device in use.

A fishing rod 19 as shown has a fishing line reel 20 mounted on it. The reel 20 has a crank arm 21 for taking up the fishing line 10 and also a drag mechanism (not shown), which can provide a braking force to the reel 20 so as to secure tension in the fishing line 10. Reference numeral 22 in the Figure designates a braking force adjusting lever of the drag mechanism. The braking force provided to the reel 20 can be adjusted steplessly by turning the lever 22. It is thus possible to set a desired level of tension in the fishing line 10.

When using the measuring device, the fishing line 10 rewound from the reel 20 is passed round the first fishing line guide 3, the tension sensor 5 and the second fishing line guide 4 in the mentioned order. By pulling the fishing line 10 in this state, the movable member 9 is displaced in the direction ① to oppose the spring 12 by the tension in the fishing line 10. The tension in the fishing line 10 is stabilized when the pulling force exerted to the fishing line 10 is increased to an extent that the fishing line 10 is rewound from the reel 20. At this time, the displacement of the movable member 9 is transmitted by the gear mechanism in an enlarged fashion to the pointer driver 8a, causing the pointer driver 8a to undergo clockwise rotation ③ and indicate the tension in the fishing line 10. It is thus possible to set a desired level of tension in the fishing line 10 by adjusting the braking force of the drag mechanism while watching the display part 2.

In the embodiment as described above, the small gear 15 which is rotatable ④ in unison with the pointer driver 8a is biased counterclockwise ⑥ by the second sector gear 17 and the torsion spring 18, and its other side than the biased side is in engagement with the first sector gear 14. When the movable member 9 is displaced by receiving tension in the fishing line 10, the first sector gear 14 pushes back ④ the small gear 15. The first sector and small gears 14 and 15 thus always are. in engagement with and push each other.

Also, with counterclockwise rotation of the small gear 15, the pinion gear 13 is biased clockwise to push the rack 11 of the movable member 11 in the direction of action ② of the spring 12. Thus, the rack 11 and the pinion gear 13 always are in engagement with and push each other. Even a slight displacement of the movable member 9 thus can be accurately transmitted to the pointer driver 8a without being affected by inter-gear backlash, and accurate tension in the fishing line 10 can be displayed on the display part 12.

The above measuring device is constructed solely with simple mechanical mechanisms and can readily and accurately measure the fishing line tension. In addition, since the measuring device is not secured to the fishing rod 19, its borrowing and lending among fishing mates is readily possible.

Figure 4:
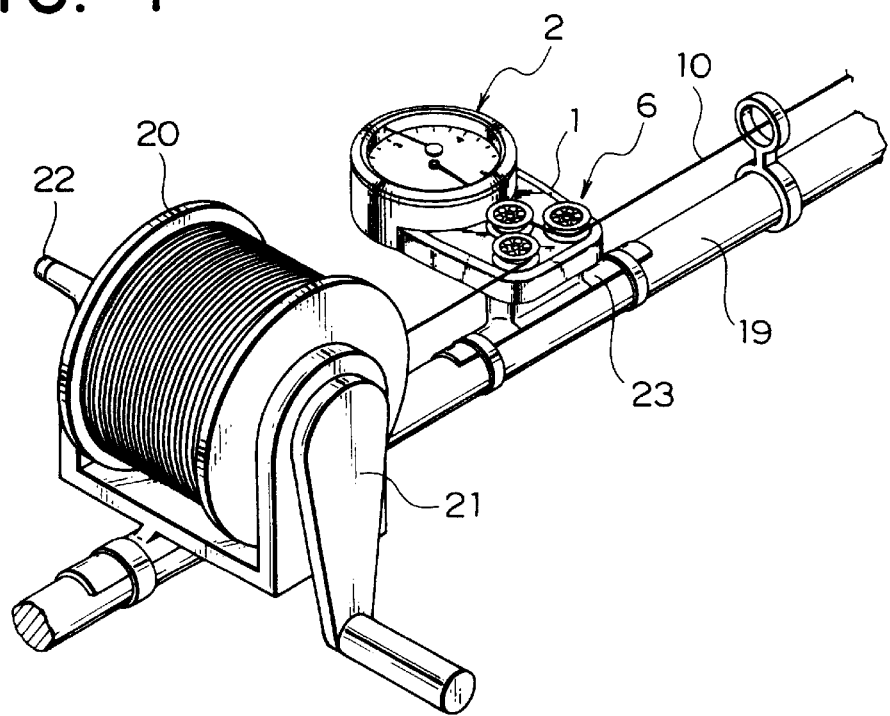
FIG. 4 is a perspective view showing a second preset fishing line tension measuring device according to the invention.

FIG. 4 is a perspective view showing a second embodiment of the invention.

In this embodiment, a securing part 23 is provided as securing means on measuring device body 1, so that the measuring device as a whole can be secured to fishing rod 19. This arrangement permits adjustment of the tension in the fishing line 10 while watching the display part 2 during fishing. In addition, when the fishing line is suddenly pulled, a buffering effect is provided to protect the fishing line 10 owing to displacement of the tension sensor 5 in addition to warping of the rod and rewinding of the fishing line in the drag mechanism.

Figure 5:
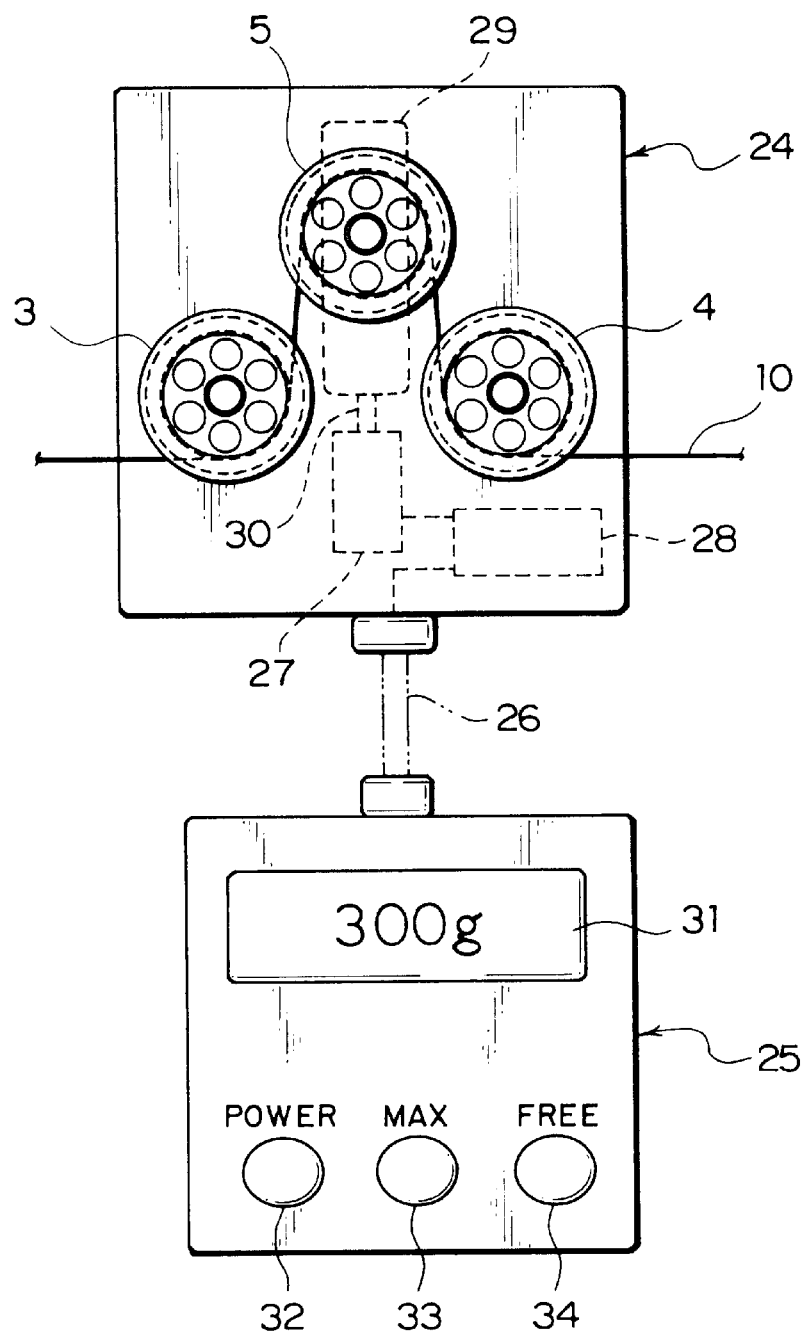
FIG. 5 is a plan view showing a third embodiment of the preset fishing line tension measuring device according to the invention.

FIG. 5 shows a plan view showing a third embodiment of the invention.

In this embodiment, a measuring part 24 for electrically measuring the fishing line tension and a display part 25 for digitally displaying the result of measurement are disposed in a remotely spaced-apart relation to each other and connected to each other by a lead line 26. Specifically, the measuring part 4 has a pressure-electricity converting element 27 and an amplifier 28 in addition to the pair fishing line guides 3 and 4 and the tension sensor 5. The tension sensor 5 is supported by a relatively small plate-like movable member 29. The movable member 29 is capable of being displaced in a reduced range, and has an end facing a pressure-bearing part 30 of the pressure-electricity converting element and applied to push the pressure-bearing part 30 when the movable member 29 is displaced by tension in the fishing line 10.

The display part 25 has a liquid crystal display 31, a power switch 32, a maximum braking force display push-button 33 and a free display push-button 34, and it further has a peak holder circuit (not shown) for holding a peak signal and a battery accommodating member (not shown). When the tension sensor 5 senses a tension in the fishing line 10 and pushes the pressure-bearing part 30 of the pressure-electricity converting element 27, the element 27 converts the exerted pressure to an electric signal and feeds out the signal to an amplifier 28. The amplifier 28 amplifies the received electric signal for digitally displaying the signal on the liquid crystal display 31 in the display part 25. By depressing the maximum braking force display push-button 33, the peak holder circuit is rendered operative to cause display of the maximum braking force in the drag mechanism on the liquid crystal display 31. By depressing the free display push-button 34, the tension in the fishing line 10 is displayed by real time display on the liquid crystal display 31.

Adjustment of the tension in the fishing line 10 with the drag mechanism may be done by rendering the peak holder circuit operative with depression of the maximum braking force display push-button 33 and adjusting the drag mechanism by pulling out the fishing line from the reel while watching the display on the liquid crystal display 31. During fishing, the fishing line tension may be displayed by real time display on the liquid crystal display 31 by depressing the free display push-button.

As has been shown, with the pressure-electricity converting element employed for converting the fishing line tension sensed by the tension sensor 5 to an electric signal, the tension sensor 5 and the movable member 29 may be less displaced, which is desired from the size reduction standpoint. In addition, with remotely spaced-apart disposition of the measuring and display parts 24 and 25, it is possible to increase the freedom of status of use of the measuring device, such as mounting the measuring part 24 on the fishing rod while holding the display part 25 with a hand.

As has been described in the foregoing in connection with some embodiments, according to the invention it is possible to preset the fishing line tension to a desired level by adjusting the drag mechanism while watching the display on the display part, which is adapted to be found near the reel. Besides, the construction is dimple, and accurate tension measurement can be readily done.

Particularly, by adopting the pulley type structure of pair fishing line guides and tension sensor, it is possible to reduce the frictional resistance offered between each of these reel-type elements and the fishing line, and no extra force is needed when pulling the fishing line. The measuring device thus can be used more handily.

Furthermore, by adopting the dial type of display part, disposing the tension sensor on the movable member, biasing the movable member in the direction to oppose the fishing line tension and arranging such that the pointer in the display part is displaced by enlarging the displacement of the movable member with the gear mechanism, the displacement of the pointer can be made more accurate since even a slight displacement of the movable member is enlarged by the gear mechanism.

Still further, by providing a securing member for securing the measuring device to the fishing rod, when the fishing line is pulled suddenly, the tension sensor can provide a buffering effect to protect the fishing line.

Moreover, with the pressure-electricity converting element adopted to convert the fishing line tension sensed by the tension sensor to an electric signal and obtain digital display thereof on the display part, the movable member and the tension sensor may be less displaced, thus permitting readier size reduction. Further, the remotely spaced-apart disposition of the display and measuring parts can enhance the freedom of status of use of the measuring device.

What is claimed is:

1. A preset fishing line-tension measuring device comprising:

a pair of spaced-apart-fishing line guides;

a tension sensor for sensing a fishing line tension, the tension line sensor being disposed between the fishing line guides so as to increase the length of path of a fishing line;

a movable member for supporting the tension sensor and being reciprocally and linearly moved in a first direction when the fishing line tension is given on the movable member through the tension sensor;

a first spring for providing a spring force on the movable member so as to move the movable member in a second direction opposite to the first direction;

a display part including a scale board and a pointer driver, the pointer driver being rotated in a third direction and displaying the fishing line tension as a rotation angle of the pointer driver in the third direction thereof on the scale board; and a gear mechanism for converting and amplifying the linear movement of the movable member into a rotary movement of the pointer driver, the gear mechanism including a rack being formed in the movable member, a pinion being meshed with the rack, a first gear being integrally connected with the pinion, and a second gear being rotatable in unison with the pointer driver, wherein the second gear rotating in a fourth direction when the movable member is moved in the first direction as the fishing line tension increases, the first gear having a radius of rotation larger than radiuses of rotation of the pinion and the second gear such that the pointer driver is rotated in the third direction in an amplified manner by the gear mechanism.

2. The preset fishing line tension measuring device according to claim 1, wherein the pair fishing line guides and the tension sensor are of pulley type.

3. The preset fishing line tension measuring device according to claim 1, which further comprises a securing means for securing it to a fishing rod.

4. The preset fishing line tension measuring device according to claim 1, wherein the measuring part includes a pressure-electricity converting element for converting the fishing line tension sensed by the tension sensor to an electric signal, the output of the pressure-electricity converting element being digitally displayed on the display part.

5. The preset fishing line tension measuring device according to claim 4, wherein the display part and the measuring part are disposed in a remotely spaced-apart relation to each other.

6. The preset fishing line tension measuring device according to claim 1, wherein the first gear is a sector gear.

7. The preset fishing line tension measuring device according to claim 1, further comprising:

a third gear formed as a sector gear and meshed with said second gear; and a second spring for biasing the third gear to rotate in a fifth direction so as to bias said second gear toward a sixth direction opposite to the fourth direction of the second gear such that a displacement of the movable member is accurately transmitted to said pointer driver without being affected by any inter-gear backlash.

8. The preset fishing line tension measuring device according to claim 7, further comprising:

a pointer provided on said scale board, said pointer being pushed and rotated in unison with said pointer driver when the pointer driver is rotated to a maximum rotation position in response to a maximum tension of the fishing line, and then the pointer being held in the maximum rotation position of the pointer driver even after the pointer driver returns so as to continually indicate the maximum tension of the fishing line.

* * * * *